United States Patent [19]

Marsh et al.

[11] 4,448,621
[45] May 15, 1984

[54] LONG SYNCHRONOUS BELT AND METHOD FOR MAKING THE SAME

[75] Inventors: Richard L. Marsh; Robert E. Wetzel, both of Springfield, Mo.

[73] Assignee: Dayco Corporation, Dayton, Ohio

[21] Appl. No.: 34,698

[22] Filed: Apr. 30, 1979

[51] Int. Cl.³ .................. B29H 7/22; F16G 1/00; B29H 7/04
[52] U.S. Cl. .................. 156/138; 156/140; 156/174; 156/304.1; 156/544; 264/145; 264/152
[58] Field of Search ............. 156/264, 137, 139, 138, 156/140; 264/145, 236, 152

[56] References Cited

U.S. PATENT DOCUMENTS

| | | | |
|---|---|---|---|
| 1,228,792 | 6/1917 | Lear | 156/137 |
| 2,323,132 | 6/1943 | Hazell | 156/264 |
| 3,069,304 | 12/1962 | Fahrbach | 156/264 |
| 3,716,610 | 2/1973 | Goldstein | 264/152 |
| 3,736,805 | 6/1973 | Dent | 156/139 |
| 3,792,621 | 2/1974 | Smith | 156/137 |
| 3,897,291 | 7/1975 | Hoback et al. | 156/138 |
| 4,083,838 | 4/1978 | Breher | 264/145 |
| 4,123,946 | 11/1978 | Hollaway, Jr. | 156/137 |

FOREIGN PATENT DOCUMENTS

| | | | |
|---|---|---|---|
| 1179771 | 10/1964 | Fed. Rep. of Germany | 156/138 |
| 2538691 | 3/1977 | Fed. Rep. of Germany | 156/137 |
| 7210407 | 7/1972 | Netherlands | 156/137 |

Primary Examiner—William R. Dixon, Jr.
Attorney, Agent, or Firm—Joseph V. Tassone

[57] ABSTRACT

A long synchronous belt made primarily of elastomeric material is provided which comprises a plurality of narrow, toothed strips joined in side-by-side fashion, each strip having at least one longitudinally-extending reinforcement located therein. Also provided is a method for making such a belt which comprises the steps of providing a first belt sleeve having the desired tooth configuration, cutting the first sleeve into a continuous strip, winding the strip to form a second sleeve of desired circumferential length, joining the adjacent strips of the second sleeve in side-by-side fashion, and cutting at least one belt of desired width from the second sleeve.

16 Claims, 15 Drawing Figures

LONG SYNCHRONOUS BELT AND METHOD FOR MAKING THE SAME

This invention relates to synchronous belts, particularly long synchronous belts, and to a method for making such belts.

BACKGROUND OF THE INVENTION

Power transmission belts for use with toothed pulleys are well known in the art. These belts have a plurality of alternating teeth and grooves extending generally transversely of the belt which mesh with alternating teeth and grooves of the toothed pulley in order to perform their driving function. The most widely used of these toothed belts are the so-called synchronous or positive drive belts which are manufactured from flexible resilient material such as natural or synthetic rubber. These belts are designed and manufactured with pitch, tooth depth, width and other measurements accurate to a precise degree with extremely close tolerances being maintained. Additionally, a high stength tensile stress-resisting member of essentially inextensible material is provided substantially on the dedendum line of the teeth to prevent undue stretching of the belt. This belt costruction allows the flexible resilient belt teeth to mesh without substantial change of pitch with the teeth of the toothed pulleys, with the belt thereby functioning as a synchronizing belt.

It is known to manufacture synchronous belts by placing a layer of fabric intended to cover the teeth and the grooves of the belt, on a grooved cylindrical drum, winding a layer of stress-resisting cord upon the layer of fabric, followed by a layer of elastomeric material on the assembly. The assembly comprising the fabric, the cord layer and the layer of elastomeric material forms a sleeve.

An elastic curing jacket is placed around the above-described sleeve which is assembled on the grooved drum, and the unit is placed in a vulcanizing chamber, to which steam under pressure is admitted. Inside the chamber the molding and curing of the belt is completed by virtue of the action of the heat and of the steam pressure.

Following the molding and curing step, the sleeve is cooled and removed from the grooved drum and individual belts are cut from the sleeve.

It is impractical to manufacture toothed belts having a large circumferential length because, to obtain them, it is necessary to provide metallic grooved drums having a very large diameter, and consequently, of a considerable weight.

Several methods have been proposed to provide synchronous drive belts in lengths greater than are available in the industry. The use of interlocking tongue members to splice the belt ends together is disclosed in U.S. Pat. No. 3,833,998, issued Sept. 10, 1974 to E. G. Tomlinson, and U.S. Pat. No. 3,988,940, issued Nov. 2, 1976 to R. Szonn and R. Breher. Another method for splicing belt comprises embedding the cord ends of two belt sections in rubber to form an endlessly body portion, as disclosed in U.S. Pat. No. 3,419,449, issued Dec. 31, 1968, to P. DiValerio, W. Skura and J. O'Donnell.

The integrity of these spliced areas is relatively poor as compared to the remainder of the belts. In general, spliced belts are rated at only 40% of the standard rated capacity, although higher ratings have been alleged.

With belts which have to run in a precise vibration-free manner, especially at higher speeds, the following conditions are to be met:
1. Homogeneity of the material over the circumferential length of the belt;
2. Uniform cross section;
3. Maintaining the neutral bending line of the cross section;
4. Uniform pull stress behavior of the strength carrier inserts over the total width;
5. Uniform preload of the strength carrier particles over the width of the belt;
6. Merger of the belt material including the reinforcement of the strength carriers at the endless connection without stiffening the bending ability.

Experience has shown that the total of these conditions when an increased quality is required are met primarily by belts with which the strength carriers consist of inserted threads, cables, or the like, which with narrow tolerances concerning the pull stresses and with identical finish tension are located closely adjacent to each other in the same neutral plane.

With fabric and other layer inserts, steps are necessary in order to obtain the precision required for a uniform running behavior of the belt. All heretofore known belts made endless show at the endless area some inhomogeneities which can be ascertained in part already by static tests. The following methods of making belt sections endless are known and have shown the following deficiencies;

a. Overlapping with straight, biased, and offset edge ends according to which the material is cemented, welded or vulcanized. This connection even with spliced ends is usable only for stresses.

b. Connection with stepped layers as they are employed in connection with conveyor belts have a satisfactory uniform run only when also the layer-shaped strength carriers are arranged in stepped manner with regard to each other. This multilayer fabrication is suitable only for heavy belts which, in view of the relatively low running speeds, do not have to meet increased precision requirements with regard to their dynamic behavior.

c. Welding and clamping connections of the strength carrier construction with subsequent overlapping (cementing, welding, or vulcanization, the nonuniformity is always felt particularly during the operation. The liability to disorders increases considerably with decreasing running diameter.

d. Connection by open or exposed special locks. In this instance, the degree of uniformity is particularly felt and a beating noise cannot be avoided.

e. Simple cross-sectional butt connections. These are sometimes prepared in a direction perpendicular to the length but also at an incline thereto, or also in the manner of an arrow. These connections will at any rate cut through the strength carrier elements. The transmitting force is limited by the strength of the belt-forming material.

f. The teeth-like interengagement with butt connection of the edges. While this connection results in a considerable extension of the interconnected edges, it will be appreciated that also in this instance the strength elements are cut through one after another. The respective only short offset arrangement does not result in any material strength transfer between the belt material and the strength carriers. Therefore, a considerably reduced transmitting force will result with belts made endless in this manner.

It is, therefore, an object of the present invention to provide a transmission belt which will overcome the above-mentioned drawbacks.

It is another object to provide a method for making an improved synchronous power transmission belt.

Other objects and advantages of the present invention will appear more clearly from the following specification, the appended claims and the accompanying drawings.

SUMMARY OF THE INVENTION

In accordance with the present invention there is provided an endless toothed power transmission belt made primarily of a vulcanized elastomeric material which comprises a plurality of narrow toothed strips joined in side-by-side fashion, each strip having at least one longitudinally extending reinforcement located therein. This belt may be provided in any length commensurate with the tooth pitch.

Also provided is a method for making the above belt which comprises the steps of providing a first belt sleeve having the desired tooth pitch and tooth shape, cutting the first sleeve into a continuous strip of predetermined width, winding the strip in helical fashion around an alignment means having grooves for aligning the teeth of adjacent strips to provide a second sleeve having a desired circumferential length, joining the adjacent strips of the second belt sleeve in side-by-side fashion, and cutting at least one belt of a desired width from the second belt sleeve.

According to one embodiment of the present invention, the first belt sleeve is partially cured, a continuous strip is cut therefrom and the continuous strip is wound around the alignment means to provide the second belt sleeve which is thereafter cured to completion.

According to another embodiment of the present invention, the first belt sleeve is completely cured, a continuous strip is cut therefrom, and the continuous strip is wound around the alignment means to provide the second belt sleeve. In this embodiment the adjacent strips of the second belt sleeve are joined together by an adhesive, a barbed fastener or a dowel.

DESCRIPTION OF THE PREFERRED EMBODIMENT

The process of the present invention is characterized primarily in that a narrow, prefabricated unfinished toothed belt with at least one reinforcing member located therein is wound around an alignment to provide a belt sleeve of a desired circumference, and the resulting sleeve is thereafter cut into at least one belt of desired width. The resulting belt is characterized in that it has the desired characteristics of a synchronous belt; i.e, the belt teeth are precisely positioned, the tooth reinforcement is continuous, and the reinforcing member is continuous and is accurately positioned throughout the length of the belt.

Figure 1:
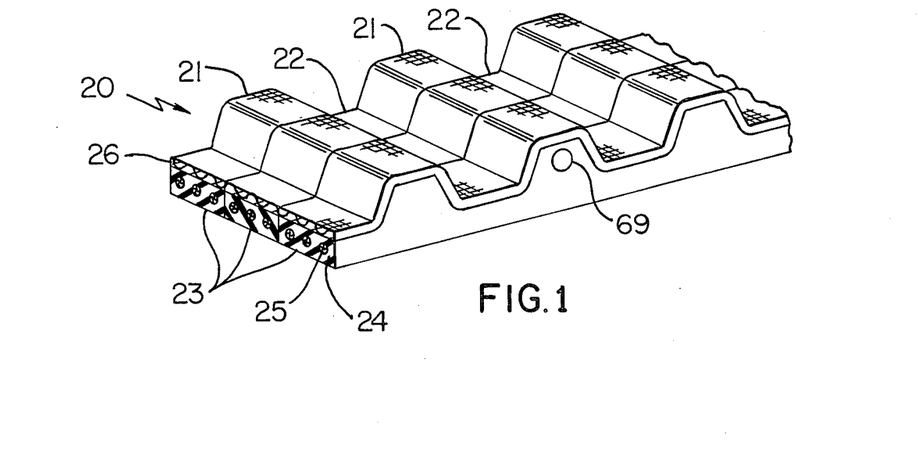
FIG. 1 illustrates a belt according to the invention.

Referring now to the drawings, FIG. 1 illustrates a belt 20 having a plurality of alternating teeth 21 and grooves 22 extending generally transversely thereof. The belt 20 comprises a plurality of narrow toothed strips 23 made primarily of an elastomeric material 24 such as natural or synthetic rubber or the like, each strip 23 having at least one longitudinally extending tensile member 25 embedded therein. The strips 23 are joined together in side-by-side fashion. The belt 20 may also comprise a fabric tooth covering 26.

Figure 2:
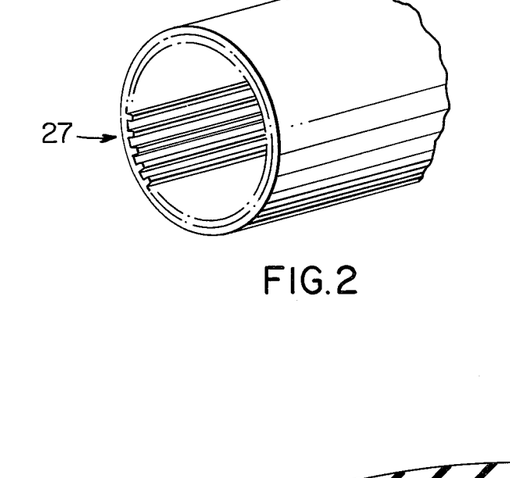
FIG. 2 illustrates a first belt sleeve.
Figure 3:
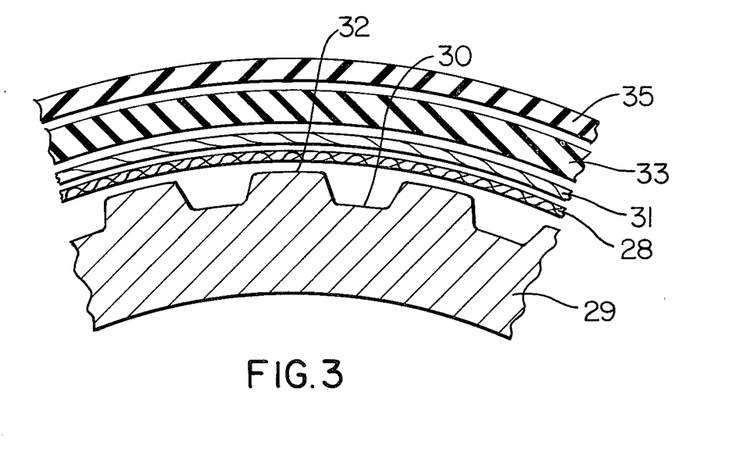
FIG. 3 illustrates a method for building the first belt sleeve.

The narrow strip 23 may be provided by first building a preliminary belt sleeve 27, as shown in FIG. 2. The sleeve 27 may be built by any method known in the art. It is presently preferred that the sleeve 27 be made using the so-called "flow through" method. According to this method, and as shown in FIG. 3, a layer of fabric 28 is wrapped circumferentially around a cylindrical grooved mold body 29 having a plurality of axially extending grooves 30 which are parallel to the rotational axis of the mold body 29. Preferably, the fabric 28 is stretchable in one direction only and the stretch therein extends circumferentially of the mold 29. Preferably the elongation of the fabric 28 should be about 60% in order to insure that the fabric will completely conform to the shape of the grooves 30, without undue strain or rupture; however, a fabric having a greater amount of elongation may be used, if desired.

The load-carrying band for the sleeve 27 is formed on the mold 29 by helically winding over the fabric layer 28 a plurality of turns, or convolutions, of at least one strand 31. The fabric 27 contacts and supports strand 31. The fabric 28 is, in turn, supported by the ridges 32 between the grooves 30 in the outer circumference of the mold 29. The strand 31 may be a flexible, substantially non-stretchable material such as prestretched cord or wire.

The fabric 28 may be made of any suitable material known in the art, such as polyester, cotton, rayon, nylon, aramid, or the like.

The strand 31 may be made of any suitable material known in the art, such as polyester, cotton, rayon, nylon, aramid, wire, or the like.

A rubber layer 33 is applied over the convolutions of the strands 31 in the form of calendered sheet, and is of sufficient thickness to provide the extruded rubber body portion of the preliminary sleeve 27. As used herein, the term "extruded rubber" and its related forms, refers to the rubber which is forced or pushed to fill the cavity of the grooves 30. The thickness of the layer 33 can be varied to adequately provide the top covering layer of the sleeve 27 since only a portion of the rubber 33 is extruded through the band formed by the strands 31. The layer 33 may be comprised of any suitble vulcanizable rubber which has the proper flow characteristics which will permit it to be forced between the strands 31 and eventually cured, i.e., vulcanized, into a firm solid.

Figure 4:
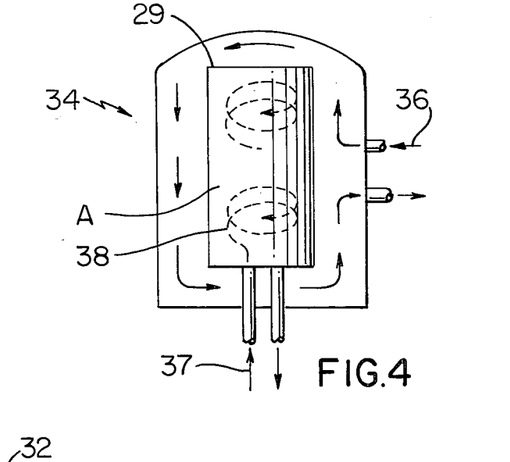
FIG. 4 illustrates an apparatus which may be used to partially vulcanize the first belt sleeve.

Having assembled the belt materials on the mold 29, the assembly is prepared to be placed in the vulcanizer apparatus 34 in which a portion of the rubber layer 33 is forced into the tooth cavities 30. For this purpose a collapsible rubber sleeve 35 is placed around the layer 33. The resulting assemby A is then placed in the vulcanizer 34.

As shown in FIG. 4, steam, indicated by the arrow 36, is introduced under controlled temperature and pressure into and out of the vulcanizer 34 and circulated around the assembly A, including the mold 29. Steam, indicated by the arrow 37, under controlled temperature and pressure, may also be introduced within the mold 29 as indicated at 38.

The steam is sufficiently hot to soften the rubber layer 33 and the pressure is sufficiently high to collapse the sleeve 35 and force the relatively fluid rubber through the voids in the helical convolutions of the strand 31 and into the grooves 30 to form the belt teeth 21. The rubber forces the stretchable tooth jacket fabric 28 ahead of it and causes it to conform to the exterior shape of the tooth forming grooves 30. The rubber 33 softens below its curing temperature, and as there is a sufficient volume of rubber in the layer 33 to form the top cover of the belt, the complete filling of the grooves 30 is effective and accurately shaped belt teeth are produced.

After the grooves 30 are completely filled, additional heat may be supplied to the vulcanizer 34 to vulcanize or cure the rubber portion of the belt. In accordance with one embodiment of the present invention, it is desirable to cure the rubber portion up to a level of about 60% of the final cure, in order to assure integrity of the belt during the later cutting and assembly steps. In a presently preferred embodiment, the rubber portion is cured to a level of about 10-60% of the total cure.

After the grooves 30 have been completely filled and the rubber partially cured, the mold 29 having the preliminary sleeve 27 thereon, is removed from the vulcanizer 34, the collapsible sleeve 35 is removed and the sleeve 27 is cooled utilizing any suitable technique known in the art.

Figure 5:
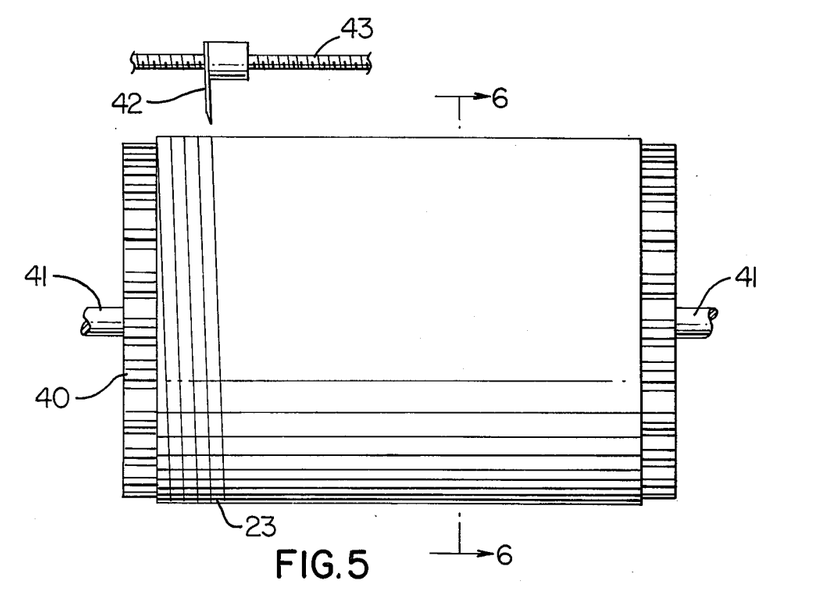
FIGS. 5 and 6 illustrate the step of cutting the first sleeve into a continuous strip.
Figure 6:
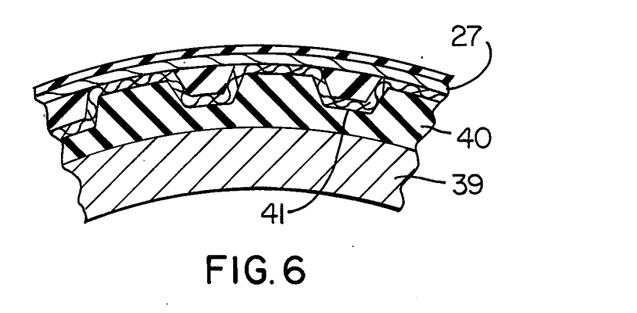

The partially cured preliminary sleeve 27 is stripped from the mold 29 and then mounted upon a cutting mandrel 39 optionally having a grooved cutting mat 40 thereon, as shown in FIGS. 5 and 6. The cutting mat 40 may be made of a suitable material, such as rubber or plastic, and has a plurality of axially extending grooves 41 which correspond to the shape and spacing of the grooves 30 of the mold 29, and mate with the teeth 21 of the preliminary sleeve 27.

The mandrel 39 having the cutting mat 40 and the sleeve 27 mounted thereon is placed on a suitable cutting device, shown in part, between the centers 41. The sleeve 27 is then cut to provide a continuous narrow toothed strip 23. This is accomplished by guiding the cutting knife 42 in a helical cut across the surface of the sleeve 27. The knife 42 is moved horizontally across the face of the sleeve 27 by means of a screw drive 43 and, at the same time, the mandrel 39 is rotated.

Figure 7:
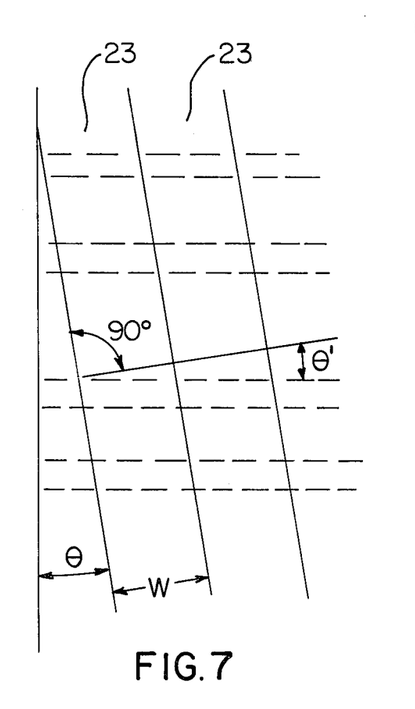
FIG. 7 illustrates the angle of the teeth in the continuous strip.

Referring now to FIG. 7, the width W of the strip 23 is determined by the helix angle $\theta$ and the circumference of the sleeve 27, according to the formula.

Width = Circumference $\times$ tangent $\theta$

In general, the helix angle $\theta$ should be in the approximate range of 0.1 to 0.5 degrees, to provide a strip width W in the approximate range 5 to 20 mm. It will be appreciated that in cutting the sleeve 27 at the helix angle $\theta$ results in the teeth 21 being skewed at an angle $\theta'$ from their normal transverse position. The magnitude of the angle $\theta'$ is equal to the cutting angle $\theta$. It is presently preferred that the cutting angle 74 be approximately equal to the helical angle of the strands 31 of the load-carrying band.

Figure 8:
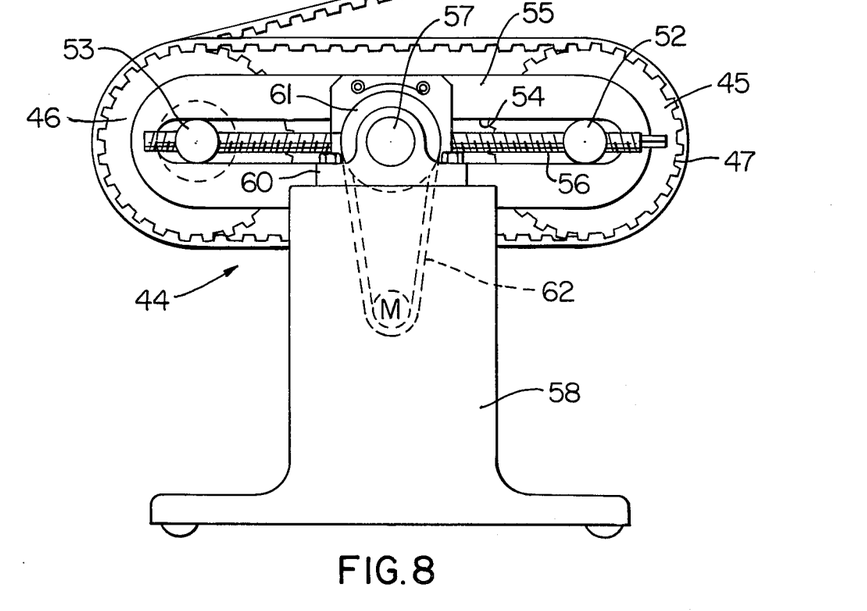
FIGS. 8 and 9 illustrate an apparatus for winding the continuous strip to make a second sleeve.
Figure 9:
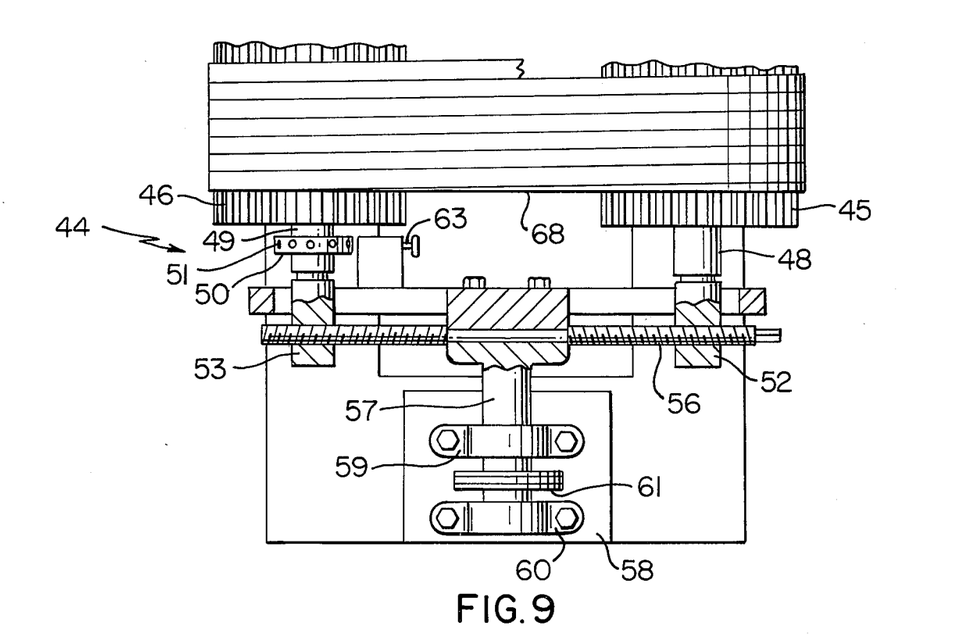

The apparatus 44 shown in FIGS. 8 and 9 is utilized in making the final belt sleeve of desired circumferential length. The apparatus 44 comprises a pair of rollers 45 and 46, having parallel axes, and preferably, grooved rollers, each having a plurality of grooves 47. The grooves 47 have a shape complementary to the shape of the teeth 21 in the preliminary sleeve 27, and are spaced apart at a distance corresponding to the pitch of the teeth 21 in the preliminary sleeve 27. Roller 45, having a shaft 48, is freely rotatable about its own axis. Roller 46 carries on its shaft 49 an indexing hub 50 having a plurality of indexing holes 51 around its periphery. The ends of the shafts 48 and 49 are freely rotatable within bearings 52 and 53 respectively.

Bearings 52 and 53 are housed within the opening 54 in plate 55, and are slideable within the opening 54. The bearings 52 and 53 housed in plate 55 are provided with threaded holes through which is passed an endless screw 56 formed in two parts, one part of which is provided with left hand threads while the other part is provided with right hand threads. By turning the screw 56, the rollers 45 and 46 are made to approach or move away from each other, through the bearings 52 and 53, respectively.

At the midpoint of the plate 55 a shaft 57 is rigidly fixed. The apparatus heretofore described is supported upon a frame 58 by the shaft 57 which is rotatable within bearings 59 and 60, these bearings being secured to the frame 58. The shaft 57 carries a pulley 61, which is secured thereto. A motor M is carried by the frame 58 and is operatively connected to the pulley 61 by a belt 62.

A removable indexing pin 63 is provided which mates with the holes 51 in the indexing hub 50 to secure the roller 46 at a desired position.

Figure 10:
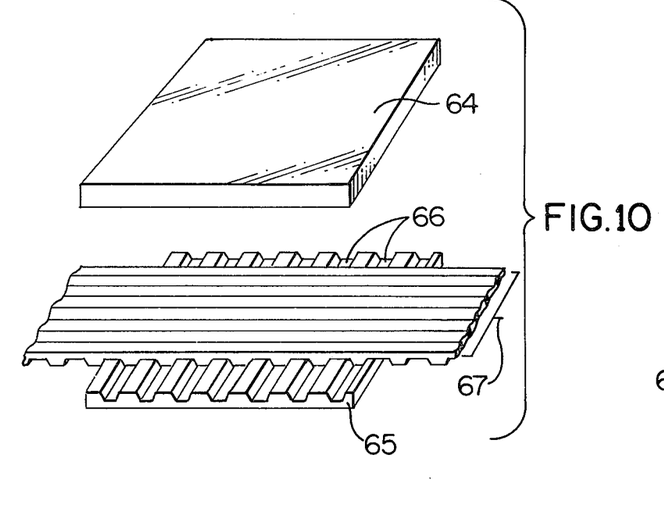
FIG. 10 illustrates an apparatus for joining the adjacent strips.

The apparatus according to the present invention is completed by a press having flat heated platens. The press, as shown in FIG. 10, has two flat platens 64 and 65, having facing surfaces. The surface of platen 64 is smooth while the surface of platen 65 has a plurality of grooves 66 having a shape complementary to the shape of the teeth to be obtained in the finished belt. The grooves are spaced apart at a distance corresponding to the pitch of the belt toothing.

Referring again to FIGS. 8 and 9, the final belt sleeve 67 is assembled as follows: The rollers 45 and 46 are displaced with respect to each other by turning the endless screw 56 in such a way that the axes of these rollers are at a mutual distance capable of allowing the production of a belt having the desired circumferential length. The roller 46 is locked in position by inserting the pin 63 into one of the holes 51 in the indexing hub 50. One end 68 of the narrow toothed strip 23 is secured to the roller 46 and the strip is then wound around the two rollers 46 and 47. The winding step may be facilitated by operating the motor M which, acting through the belt 62 and the pulley 61 causes the sub-assembly comprising the rollers 45 and 46, and plate 55, to rotate on the shaft 57. The winding step is continued until the final sleeve 67 is built up to a desired width.

Figure 11:
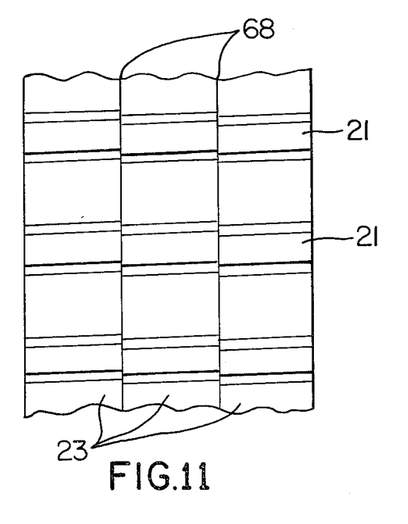
FIGS. 11 and 12 illustrate the alignment of the teeth in adjacent strips when the continous strip is wound upon the apparatus shown in FIGS. 8 and 9.

In order to assure bonding of the strips 23 in side-by-side relation, it is presently preferred that a rubber adhesive be applied to one or both of the sides of the strip 23, i.e., the surfaces to be bonded together. This adhesive is shown in FIG. 11 and designated generally by the reference number 68. The rubber adhesive should have curing properties, i.e., it is formulated with one or more crosslinking agents to effect crosslinking at an elevated temperature. A typical rubber adhesive comprises from about 10 to about 30 percent solids, polymers and dispersed fillers in solvent. The polymer may be a neoprene-type polymer or a co-polymer in which a small proportion of another monomer is present. It may also be desirable to prime the strip 23 with a primer prior to applying the rubber adhesive thereto. Other rubber adhesives and adhesive systems will be readily apparent to those skilled in the art.

As previously discussed, the teeth 21 in the strips 23 are skewed at an angle $\theta'$ due to the cutting of the strip at an angle $\theta$. When the strips 23 are assembled on the apparatus 44, the teeth 21 in adjacent strips may be slightly mis-matched, as seen in FIG. 11. This possible mis-match is removed in the final curing step.

Figure 12:
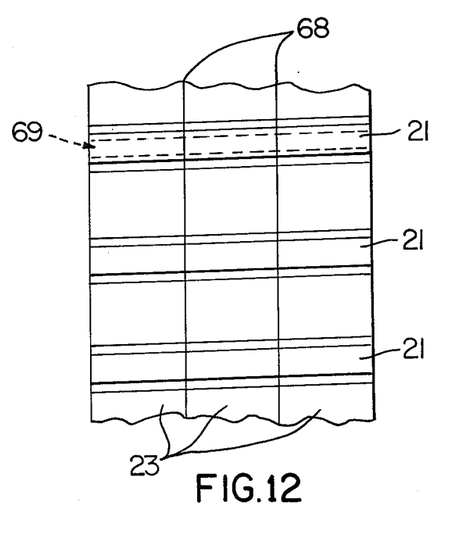

After the final sleeve 67 has been built up to a desired width, the sleeve 67 is placed in the press, as shown in FIG. 10, the press platens 64 and 65 are approached and pressed one against the other. Under the action of the pressure exerted by the platens and of the heat transmitted by them, the portion of the sleeve arranged between the press platens is molded and simultaneously cured. This step is repeated, as necessary, to cure the entire sleeve. During the final curing step, the rubber, having been only partially cured previously, may become sufficiently flowable so that the teeth in adjacent strips align accurately with each other, as shown in FIG. 12.

The cured sleeve is then removed from the press and individual belts of desired width are cut therefrom.

According to another embodiment of the present invention a first belt sleeve 27 is provided in the manner described above. This sleeve is, however, completely cured and the cured sleeve is cut to provide a continuous narrow toothed strip 23. A rubber adhesive is applied to at least one of the sides of the strip 23 and this strip is then wound upon the apparatus shown in FIGS. 8 and 9 to provide the final belt sleeve 67. The sleeve 67 is then placed in the press apparatus, shown in FIG. 10, and the rubber adhesive is cured to effect bonding of the adjacent strips. The sleeve is then cut to provide at least one belt of desired width.

Because the rubber in the strip 23 is completely cured, the teeth 21 in the sleeve 67 will be slightly mis-matched, as seen in FIG. 11. Any such mis-match will, however, not cause problems because the mis-match is very small. Such mis-match is calculated according to the formula $\frac{1}{2}$ (W tan $\theta'$) where W is the width of the strips 23 and $\theta'$ is the skew angle of the teeth 21. For example, 20 mm wide strips cut at an angle of 0.5 degree will have a mis-match of $\frac{1}{2}$ (20 tan 0.5) or about 0.085 mm between the adjacent strips.

Figure 14:
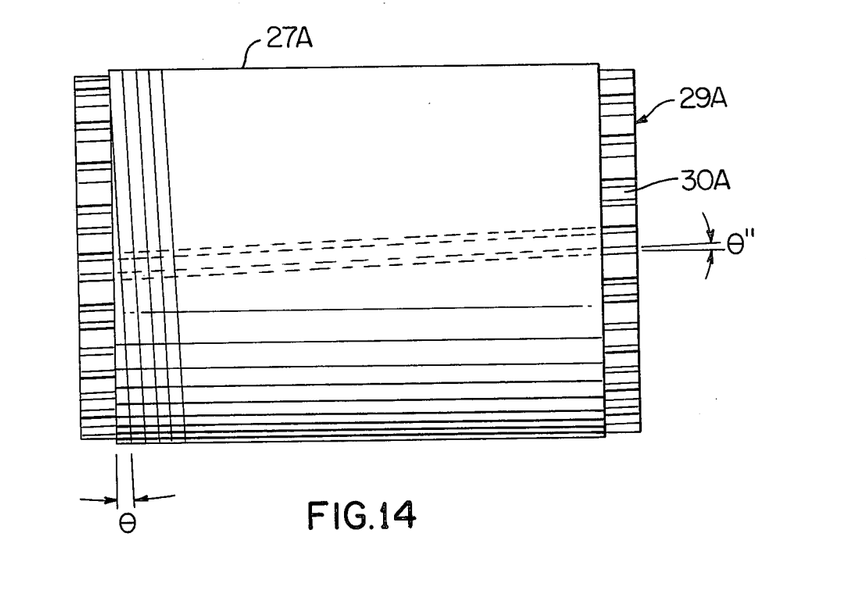
FIG. 14 illustrates another embodiment of the invention.
Figure 15:
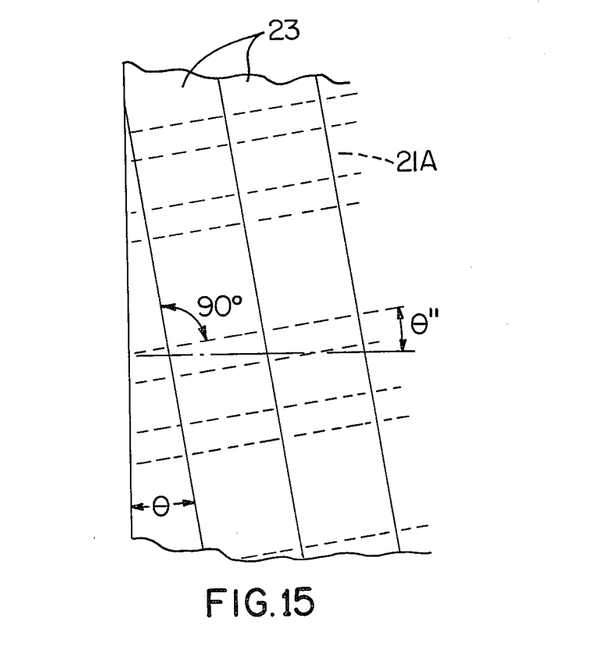
FIG. 15 illustrates the angle of the teeth in the continuous strip when the first belt sleeve is provided in accordance with the embodiment shown in FIG. 14.

Instead of building the preliminary sleeve 27 upon a standard mold 29, as previously described, it is within the scope of this invention to provide a mold 29A, as shown in FIG. 14, having a plurality of spaced grooves 30A which are disposed at an angle $\theta''$ relative to the rotational axis of the mold body 29A. The groove angle $\theta''$ is equal to a preselected cutting angle $\theta$. A preliminary sleeve 27A, when built upon the mold 29A will have toothed portions 21A which are skewed at the angle $\theta''$. When the preliminary sleeve 27A is cut into a continuous strip 23 at a cutting agle $\theta$, the teeth 21A are disposed at an angle of 90 degrees relative to the lengthwise direction of such strip, as seen in FIG. 15. This strip may be assembled to provide a final belt sleeve 67 in which there is no mis-match between the teeth 21 of adjacent strips 23.

Figure 13:
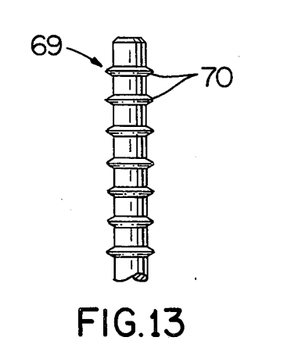
FIG. 13 illustrates a barbed coupling for joining adjacent strips.

It is also within the scope of this invention to join the strips 23 in side-by-side fashion by a coupling 69, indicated by the dashed lines in FIG. 12 and also shown in FIG. 1, which is inserted into preformed holes in the teeth 21 of the strips 23. The coupling 69 may be a smooth dowel, as shown in FIG. 12, or it may be a barbed coupling, i.e., it may have a plurality of continuous, circular, external ribs 70 with sharp edges as gripping heads, as shown in FIG. 13. The coupling 69 may be made from a suitable material, such as rubber or plastic. If desired the coupling 69 may be adhered to the strips 23 using the rubber adhesive 68. The coupling 69 is inserted through at least a portion of the teeth of adjacent strips at any desired spacing, but preferably at least every 10th tooth, or less.

Although the drawings illustrate a synchronous belt having trapezoidal-shaped teeth, the present invention is not limited thereto. The process of this invention may also be used to make synchronous belts having the tooth shapes shown, for exmple, in U.S. Pat. Nos. 3,756,091 and 3,924,481.

Various modifications may be made in the present invention without departing from the spirit of the invention and the scope of the appended claims.

We claim:

1. A process for manufacturing an endless toothed power transmission belt made primarily of elastomeric material which comprises the steps of:
    (a) providing a first belt sleeve made primarily of elastomeric material and having a load-carrying band located therein, said first sleeve having a desired circumferential length, tooth pitch and tooth shape by the steps comprised of winding a fabric around the outer circumference of a cylindrical mold having substantially axially extending grooves therein to form tooth cavities beneath said fabric, helically winding at least one strand in a plurality of convolutions around said mold over said fabric to form said load-carrying band, applying a layer of moldable rubber over said band, heating said layer to soften it and applying pressure to said rubber to force said softened rubber through the spaces between successive convolutions of said band and filling said tooth cavities by forcing said fabric into contact with the walls of said grooves and filling the space between said fabric and said band with said rubber; and thereafter at least partially curing said rubber;
    (b) cutting said first sleeve in helical fashion into a continuous strip of predetermined width;
    (c) providing an alignment means having a plurality of grooves, said grooves having a shape complimentary to said tooth shape and having a spacing corresponding to said tooth pitch;

(d) winding said strip in helical fashion around said alignment means to provide a plurality of adjacent strips and aligning the teeth of adjacent strips with each other and with said grooves in said alignment means to provide a second belt sleeve, said second sleeve having a circumferential length different from the circumferential length of said first sleeve;

(e) joining said adjacent strips in side-by-side relation; and (f) cutting at least one belt from said second sleeve.

2. The process of claim 1 wherein said first sleeve providing step comprises building up said sleeve on a cylindrical grooved mold body, wherein said grooves are disposed at an angle in the approximate range of 0.1 to 0.5 degrees relative to the rotational axis of said mold body.

3. The process of claim 1 wherein said first sleeve is cured to a level ranging from about 10 to about 60 percent of the final cure prior to said cutting step.

4. The process of claim 3 wherein said strips are joined together by applying a rubber adhesive to at least one side of said continuous strip, and thereafter completely curing the said second belt sleeve.

5. The process of claim 4 wherein said adhesive is a heat-curing adhesive.

6. The process of claim 4 wherein said adjacent strips are additionally joined together by a coupling through at least a portion of the teeth of adjacent strips.

7. The process of claim 6 wherein said coupling is a dowel.

8. The process of claim 6 wherein said coupling is barbed.

9. The process of claim 1 wherein said first sleeve providing step comprises building up said sleeve on a cylindrical grooved mold body, wherein said grooves are parallel to the rotational axis of said mold body.

10. The process of claim 1 wherein said first belt sleeve is completely cured and wherein said adjacent strips are joined together by a coupling through at least a portion of the teeth of said strips.

11. The process of claim 10 wherein said coupling is a barbed coupling.

12. The process of claim 10 wherein said coupling is a dowel.

13. The process of claim 1 wherein said first sleeve is cut in helical fashion at a helical angle in the approximate range of 0.1° to 0.5° to provide a continuous strip having a width in the approximate range of 5 to 20 mm.

14. The process of claim 6 wherein said first sleeve providing step comprises the step of helically winding at least one strand in a plurality of convolutions to form said load-carrying band, wherein said winding angle is approximately equal to said subsequent cutting angle.

15. The process of claim 1 wherein said first belt sleeve is completely cured and wherein said adjacent strips are joined one to the other by a rubber adhesive.

16. The process of claim 8 wherein said adhesive is a heat-curing adhesive and wherein said second belt sleeve, following assembly, is subjected to heating sufficient to cure said adhesive.

* * * * *